US012759371B2

(12) United States Patent
Capellmann et al.

(10) Patent No.: US 12,759,371 B2
(45) Date of Patent: Oct. 13, 2026

(54) DEVICE FOR REDUCING THE NOISE OF MOTOR VEHICLE AIR CONDITIONING UNITS

(71) Applicant: Hanon Systems, Daejeon (KR)

(72) Inventors: Christoph Capellmann, Würselen (DE); Harald Jung, Bornheim (DE); Nitin Ramesh Chincholkar, Kerpen (DE)

(73) Assignee: HANON SYSTEMS, Daejeon (KR)

( * ) Notice: Subject to any disclaimer, the term of this patent is extended or adjusted under 35 U.S.C. 154(b) by 432 days.

(21) Appl. No.: 18/614,694

(22) Filed: Mar. 24, 2024

(65) Prior Publication Data

US 2024/0336109 A1 Oct. 10, 2024

(30) Foreign Application Priority Data

Apr. 6, 2023 (DE) ..................... 10 2023 108 913.7

(51) Int. Cl.
*B60H 1/00* (2006.01)

(52) U.S. Cl.
CPC ..... *B60H 1/00507* (2013.01); *B60H 1/00021* (2013.01); *B60H 1/00671* (2013.01); *B60H 2001/006* (2013.01)

(58) Field of Classification Search
CPC ............ B60H 1/00507; B60H 1/00021; B60H 1/00671; B60H 2001/006; B60H 1/00471;
(Continued)

(56) References Cited

U.S. PATENT DOCUMENTS 6,669,548 B2 * 12/2003 Fujiwara ............ B60H 1/00685 165/41
2002/0009969 A1 * 1/2002 Sato ................... B60H 1/00671 454/139

(Continued)

FOREIGN PATENT DOCUMENTS

CN 101284490 A * 10/2008 ......... B60H 1/00471
CN 113056614 A * 6/2021 ......... F04D 29/4213

(Continued)

OTHER PUBLICATIONS

Xiao, Ban-xiang, CN113056614 Translation.pdf, "Centrifugal blower", Jun. 2021, pp. 1-72.*

(Continued)

*Primary Examiner* — Ryan L Faulkner
(74) *Attorney, Agent, or Firm* — Shumaker, Loop & Kendrick, LLP

(57) ABSTRACT

A device for reducing the noise of motor vehicle air conditioning units, having at least one air flow limiting element which projects laterally on an outer circumference of an axial air inlet opening vertically out of an air inlet opening plane and has a surface which limits or blocks a flow path next to the axial air inlet opening, at least two plate-shaped air guiding elements, which are arranged on an inside of a recirculation air flap in mutually spaced parallel planes at right angles to an axis of rotation of the recirculation air flap, and an air flow guiding element which is arranged on a fan tongue and extends radially from the fan tongue at a distance from a fan wheel into a spiral flow channel.

15 Claims, 8 Drawing Sheets

(58) Field of Classification Search
CPC ... B60H 1/00464; B60H 1/3414; B60H 1/345
USPC .......................................................... 454/152
See application file for complete search history.

(56) References Cited

U.S. PATENT DOCUMENTS

| | | | | |
|---|---|---|---|---|
| 2008/0026687 A1* | 1/2008 | Maehata | B60H 1/00685 454/195 |
| 2009/0036047 A1* | 2/2009 | Deneau | B60H 1/00849 454/145 |
| 2019/0315196 A1* | 10/2019 | Lee | B60H 1/241 |
| 2023/0097990 A1* | 3/2023 | Cho | F04D 29/162 415/204 |

FOREIGN PATENT DOCUMENTS

| | | | |
|---|---|---|---|
| DE | 102009009912 B4 * | 5/2019 | B60H 1/00849 |
| JP | 2020084819 A * | 6/2020 | B60H 1/00471 |

OTHER PUBLICATIONS

Jiang, Fushan, CN101284490 Translation.pdf, "Blower for vehicles", Oct. 2008, pp. 1-41.*
Hamasaki, Hiroyuki, DE1020090009912 Translation.pdf, "Innen-/Außenluftumschaltvorrichtung eines Fahrzeugklimatisierungs-systems", Sep. 2009, pp. 1-34.*
Nagata, Ippei, JP2020084819 Translation.pdf, "Blower", Jun. 2020, pp. 1-44.*

* cited by examiner

DEVICE FOR REDUCING THE NOISE OF MOTOR VEHICLE AIR CONDITIONING UNITS

CROSS-REFERENCE TO RELATED APPLICATION

The present application claims the benefit of and priority to German Patent Application No. 10 2023 108 913.7, filed Apr. 6, 2023, the entire contents of which are incorporated herein for all purposes by reference.

FIELD

The invention relates to a device for reducing noises in motor vehicle air conditioning units. The device according to the invention is provided in particular to reduce low-frequency noises below the frequency of 1000 Hz in motor vehicle air conditioning units.

BACKGROUND

For motor vehicle air conditioning units, radial fans are often used to generate the air flows necessary for vehicle ventilation. The basic structure of a radial fan comprises a fan housing having an axial air inlet opening, a fan screw, and an air outlet opening, which is usually oriented radially. Inside the fan housing there is a driven fan wheel, with which air is drawn in via the axial air inlet opening. The drawn-in air passes through the screw-shaped flow channel of the fan screw via the fan tongue to the air outlet opening. The design of the axial air inlet opening is conceivably realised simply with an axial cut-out, which is usually situated in the region of the driven fan wheel. The simple structural and functional design of the region in front of the axial air inlet and a low pressure loss downstream of the fan screw do not require any particular measures to conduct air into the fan wheel, and therefore, despite a comparatively simply designed fan tongue, only a small amount of air passes from the fan screw through the blades of the fan wheel back into the air inlet opening. However, this is different in newer motor vehicle air conditioning units, since the region of the axial air inlet is assigned more and more functions, which result in changed air flows owing to adaptations to the installation space. Reduced installation spaces mean that mechanical elements of flaps for air layering are moved closer to the air inlet and thus into the region of influence of air flows. Furthermore, the fan not only has to be supplied with fresh air or recirculation air; additional functions are required such as partial recirculation air with or without dynamic pressure compensation and devices for avoiding an overflow of fresh air into the recirculation air flow. The increased complexity of the air inlet in the intake region leads to changed characteristics of the air flowing into the fan. Air flows which lead past mechanical elements of the flaps or past the flaps themselves can cause vortices, which is associated with an undesirable generation of noise. Furthermore, higher pressure losses arise in the interior of the air conditioning unit downstream of the fan screw owing to increasingly smaller installation spaces and higher demands on the components installed there, such as filters and heat exchangers, which is likewise associated with an undesirable generation of noise.

Particular challenges are associated with the development of motor vehicle air conditioning units for electric vehicles, since air conditioning units represent a considerable source of noise in electric vehicles, owing to the lack of a combustion engine. In addition to the increased demands in terms of the acoustics of motor vehicle air conditioning units, the conditions under which the acoustic specifications must be met are becoming more and more difficult. These include, for example, higher pressure losses, for example of heat exchangers or filters with a higher efficiency. Furthermore, smaller and smaller installation spaces are available.

The said influences result in undesirable acoustic phenomena such as buzzing, for example, in particular in the frequency range below 1000 Hz. Measures such as using insulation materials cannot achieve the desired success in this frequency range. Therefore, the approach is taken of avoiding the occurrence of noise emissions in particular in the range of frequencies below 1000 Hz.

SUMMARY

The object of the invention thus consists in proposing a device with which air flow-induced noises of a motor vehicle air conditioning unit, in particular a radial fan of a motor vehicle air conditioning unit, are reduced. It should be possible with the device to counteract the generation of noises at frequencies below 1000 Hz.

The object is achieved by subject matter having the features shown and described herein.

The device according to the invention for reducing noise is intended for motor vehicle air conditioning units in which an air flow is generated with a radial fan. A radial fan within the meaning of the invention comprises a fan housing with a spiral or screw-shaped inner contour which forms a spiral flow channel, wherein a drivable fan wheel is arranged in the interior of the fan housing. Axially in relation to the rotational axis of the fan wheel, the fan housing has an air inlet opening within an air inlet opening plane. The air inlet opening plane is understood as a plane of the fan housing in which the axial air inlet opening is formed. In the fan housing interior, a flow channel leads along the spiral inner contour via a fan tongue to an air outlet opening of the fan housing. Air is drawn in via the axial air inlet opening using the driven fan wheel. The drawn-in air is conveyed from the fan interior via the fan tongue to an air outlet opening. The air to be drawn in can be provided from a flow channel with a flow path which leads transversely over the air inlet opening plane and the axial air inlet opening. The flow channel can be supplied with fresh air from one side, wherein the opposite side is connected to a flow path for recirculation air. A recirculation air flap for changing flow paths of the air drawn in from the flow channel is pivotable at least in some areas over the axial air inlet opening. The recirculation air flap allows fresh air operation in a first position and recirculation air operation in a second position. The design of the inside of the recirculation air flap allows an air flow to be deflected in the direction of the axial air inlet opening in the first position or in the second position.

The device according to the invention for reducing noise has at least one air flow limiting element which projects laterally on the outer circumference of the axial air inlet opening vertically out of the air inlet opening plane of the fan housing. The at least one air flow limiting element has a surface which limits or blocks a flow path next to the axial air inlet opening. The arrangement of the at least one air flow limiting element next to the axial air inlet opening results in a reduction in the cross section of the flow channel leading transversely over the axial air inlet opening. The arrangement of the at least one air flow limiting element at right angles to the air inlet opening plane next to the opening cross section of the axial air inlet opening prevents air flows next to the opening cross section of the axial air inlet opening over the air inlet opening plane. Advantageously, a flow of air past the axial air inlet opening of the fan screw into a rear region of the axial air inlet opening is thereby prevented or limited, as a result of which undesirable vortices above the fan wheel or below the recirculation air flap are avoided. The drawn-in air can flow more uniformly through a front region of the axial air inlet opening into the fan wheel.

In addition to the arrangement of the at least one air flow limiting element, the device has at least two plate-shaped air guiding elements, which are arranged on the inside of the recirculation air flap in mutually spaced parallel planes at right angles to the recirculation air flap pivot axis. Owing to the plate-shaped air guiding elements arranged in parallel and spaced apart on the inside of the recirculation air flap, a recirculation of the air flowing in an upper part of the axial air inlet opening in front of the recirculation air flap above the fan wheel is reduced. The air which flows across the axial air inlet opening above the at least one air flow limiting element can thus flow more uniformly into the fan wheel, as a result of which less low-frequency noise is generated.

Furthermore, in combination with the arrangement of the at least one air flow limiting element and the at least two plate-shaped air guiding elements on the inside of the recirculation air flap, the device according to the invention has an air flow guiding element which is arranged on the fan tongue and extends radially from the fan tongue at a distance from the fan wheel into the spiral flow channel. The air flow guiding element forms a barrier in some regions between the fan wheel and the spiral flow channel. Owing to the arrangement of the air flow guiding element, the flow channel inside the radial fan is extended in the direction of the air outlet opening. In this way, the proportion of air which flows from the radial fan through the blades of the fan wheel back into the axial air inlet opening is reduced. In other words, the risk of conveyed air flowing back into the region of influence of the fan wheel is reduced. In air conditioning units which have comparatively high counterpressures, the design of the fan tongue with the air flow guiding element results in the advantageous effect that less air passes out of the screw-shaped flow channel through the blades of the fan wheel back into the axial air inlet opening. The resistance of the conveyed air is thus reduced in the direction of the air outlet opening via which the air passes into a diffuser adjoining the radial fan. The reduction of the backflow and the simultaneously improved filling of the diffuser in turn result in more favourable flow characteristics, which advantageously contribute to a reduction in the generation of noise, in particular in the low-frequency range.

An arrangement of the at least one air flow limiting element and the at least two plate-shaped air guiding elements on the inside of the recirculation air flap already results in a successful reduction in undesirable air flow noise so that a reduction in noise for motor vehicle air conditioning units can be achieved. It has also been found that, as a result of the combined arrangement of the at least one air flow limiting element, the at least two plate-shaped air guiding elements on the inside of the recirculation air flap, and the air flow guiding element on the fan tongue, a particularly good reduction in the generation of noise in the low-frequency range, i.e., at frequencies below 1000 Hz, is achieved.

The at least one air flow limiting element can be arranged in front of the recirculation air flap in the direction of flow of fresh air drawn in. In this case, the air flow limiting element is situated outside a pivot region of the recirculation air flap in a front region of the axial air inlet opening. A height of the air flow limiting element projecting vertically out of the air inlet opening plane of the fan housing can be lower than the height of the flow channel which extends transversely to the axial air inlet opening and from which the fresh air is provided. The height of the air flow limiting element projecting vertically out of the air inlet opening plane of the fan housing can be lower than the highest position of the recirculation air flap above the air inlet opening plane. In other words, the height of the at least one air flow limiting element above the air inlet opening plane is smaller than the highest position of the recirculation air flap above the air inlet opening plane. Preferably, the geometry of the at least one air flow limiting element ensures that at least some of the supplied air can flow at a distance over the air inlet opening plane next to the opening cross section of the axial air inlet opening. This portion of the air flowing past at a distance over the axial air inlet opening passes into the region of influence of the recirculation air flap. Since the at least one air flow limiting element does not extend over the entire height of the flow channel running transversely to the axial air inlet opening, the flow of the air flowing over the air inlet opening plane above the highest position of the air flow limiting element is influenced only slightly or not at all.

The at least one air flow limiting element can be designed in one part or as an integral component of the radial fan housing. In this case, the at least one air flow limiting element extends vertically out of the air inlet opening plane of the fan housing as a plate-shaped element with its surface which forms a barrier for air flows next to the opening cross section of the axial air inlet opening. The surface of the at least one air flow limiting element is preferably oriented transversely to the air flow. It can also be provided for the surface of the air flow limiting element to be slightly inclined in a direction of flow in order to allow air flows to be diverted in a desired direction.

It can also be provided for the air flow limiting element to be designed as a part of an air inlet housing in which the recirculation air flap and at least one further flap as a fresh air flap can be accommodated. The air inlet housing in the form of an independent housing part can be connected to the radial fan housing such that the air flow limiting element is situated laterally at the outer circumference of the axial air inlet opening.

According to a preferred embodiment of the device according to the invention, two air flow limiting elements are arranged laterally opposite one another on the outer circumference of the axial air inlet opening, wherein the air flow limiting elements arranged opposite one another can have sloping sides leading away from one another on their facing narrow sides so that the opening cross section of the flow channel leading transversely over the axial air inlet opening is enlarged between the opposing narrow sides of the air flow limiting elements in the vertical direction leading away from the air inlet opening plane.

According to a further advantageous embodiment of the device according to the invention, that a plurality of the plate-shaped air guiding elements can be arranged on the inside of the recirculation air flap, the plate-shaped air guiding elements being evenly spaced apart. A uniform air flow and deflection into the axial air inlet opening can thus be brought about in a simple manner.

The plate-shaped air guiding elements can be designed as integral components of the recirculation air flap. In this case, the plate-shaped air guiding elements can have a right-angled triangle shape.

The air flow guiding element can have a recess tapering in the direction of the air outlet opening. According to one embodiment, the air flow guiding element can be designed as an integral component of the radial fan housing in the form of an extension of the fan tongue. According to a further embodiment, the air flow guiding element can be formed in two parts from an upper air flow guiding element and a lower air flow guiding element, the upper air flow guiding element and the lower air flow guiding element being arranged axially opposite one another. The opposing elements then form the geometry of the recess together. The upper air flow guiding element and/or the lower air flow guiding element can have a tip pointing into the spiral flow channel with a radius which corresponds to 0.25 times to 0.75 times the radius of the fan tongue. The radius at the tip of the air flow guiding elements is thus smaller than the radius of the fan tongue.

Furthermore, it can be provided for the upper air flow guiding element and/or the lower air flow guiding element on the fan tongue to have an axial height which corresponds to 0.35 times to 0.75 times the axial height of the fan wheel. In this case, an axial height of the tip of the upper air flow guiding element and/or of the lower air flow guiding element pointing into the spiral flow channel can correspond to a maximum of 0.7 times the axial height of the upper air flow guiding element and/or of the lower air flow guiding element at the fan tongue. It can also be provided for a contour of the tip of the upper air flow guiding element and/or of the lower air flow guiding element to have no radius.

The axial height of the upper air flow guiding element and/or of the lower air flow guiding element increases from the tip in the direction of flow. The radial width of the upper air flow guiding element and/or of the lower air flow guiding element can also increase in the direction of flow. The increase in the width can be limited to the side of the relevant air flow guiding element facing the spiral flow channel. The surfaces of the upper air flow guiding element and/or of the lower air flow guiding element can have a concave or convex contour oriented in the direction of flow.

The air flow guiding element or the upper air flow guiding element and/or the lower air flow guiding element can have a wrap angle related to the fan wheel in the range of 47° and 67°.

BRIEF DESCRIPTION OF THE DRAWINGS

Further details, features and advantages of embodiments of the invention can be found in the description of exemplary embodiments below with reference to the associated drawings. In the drawings.

DETAILED DESCRIPTION

Recurring features are labelled with the same reference signs in the figures.

Figure 1:
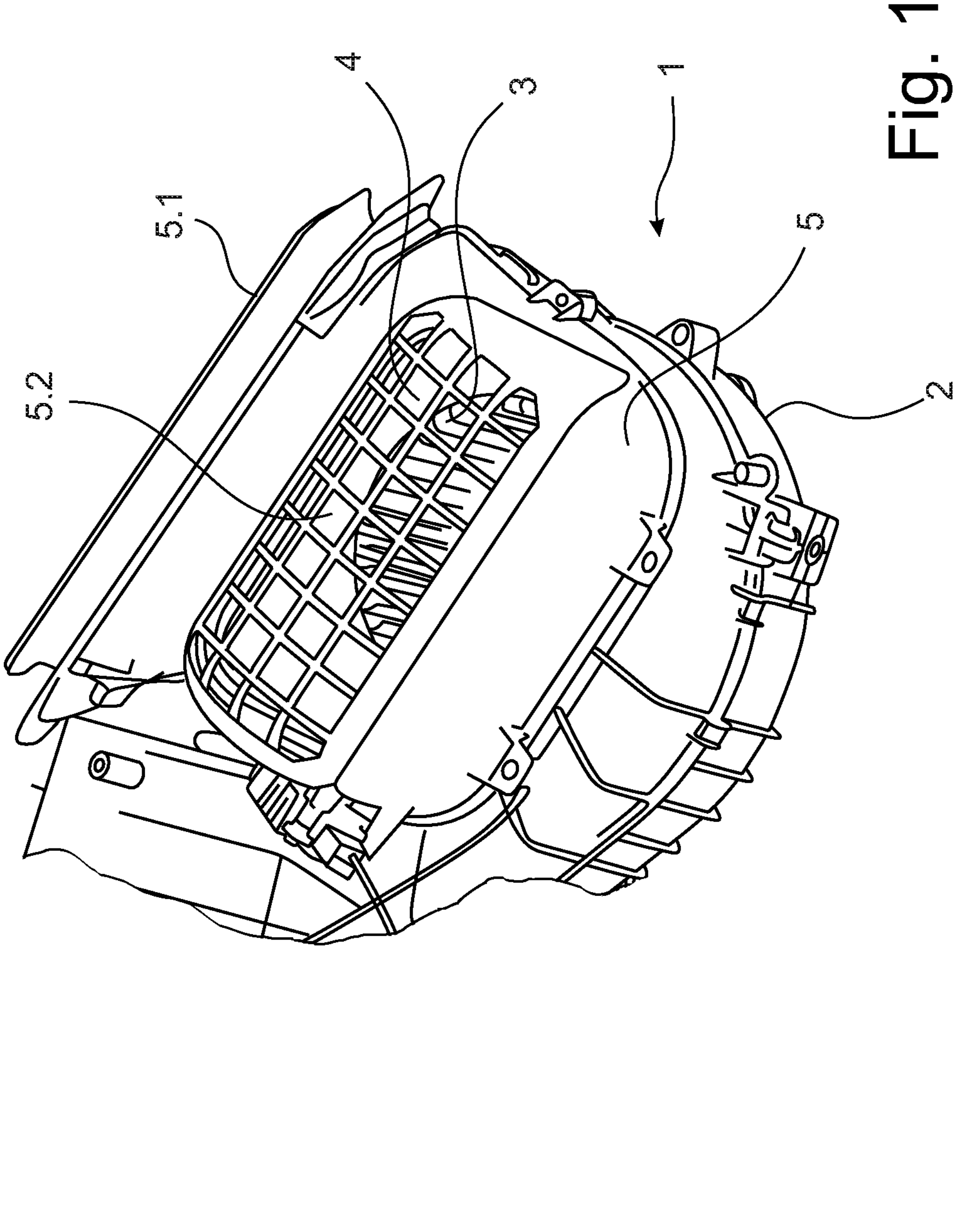
FIG. 1: shows a schematic diagram of an exemplary embodiment of a radial fan for a motor vehicle air conditioning unit according to the prior art.

FIG. 1 shows a schematic diagram of an exemplary embodiment of a radial fan 1 for a motor vehicle air conditioning unit according to the prior art. The radial fan 1 comprises a fan housing 2 with a spiral or screw-shaped inner contour, which is not visible owing to the perspective representation. A drivable fan wheel 3 is arranged in the interior of the fan housing 2. An electric motor can be provided for driving the fan wheel 3. Axially to the rotational axis of the fan wheel 3, the fan housing 2 has an air inlet opening 4, which is partially concealed by a separate air inlet housing 5 in the diagram shown. In the housing interior of the fan housing 2, a flow channel leads along the spiral inner contour via a fan tongue 6 (shown in FIG. 2) to an air outlet opening 7 (see FIG. 2), which opens into a diffuser in the example shown. Air is drawn in via the axial air inlet opening 4 using the driven fan wheel 3. The drawn-in air is conveyed from the fan interior via the fan tongue 6 (see FIG. 2) to the air outlet opening 7. The air is provided from a flow channel or from a flow path which is connected to the air inlet housing 5. The air inlet housing 5 comprises a fresh air inlet 5.1 and a recirculation air inlet 5.2, through which air passes axially into the radial fan 1 without substantial influence of the air flow.

Figure 2:
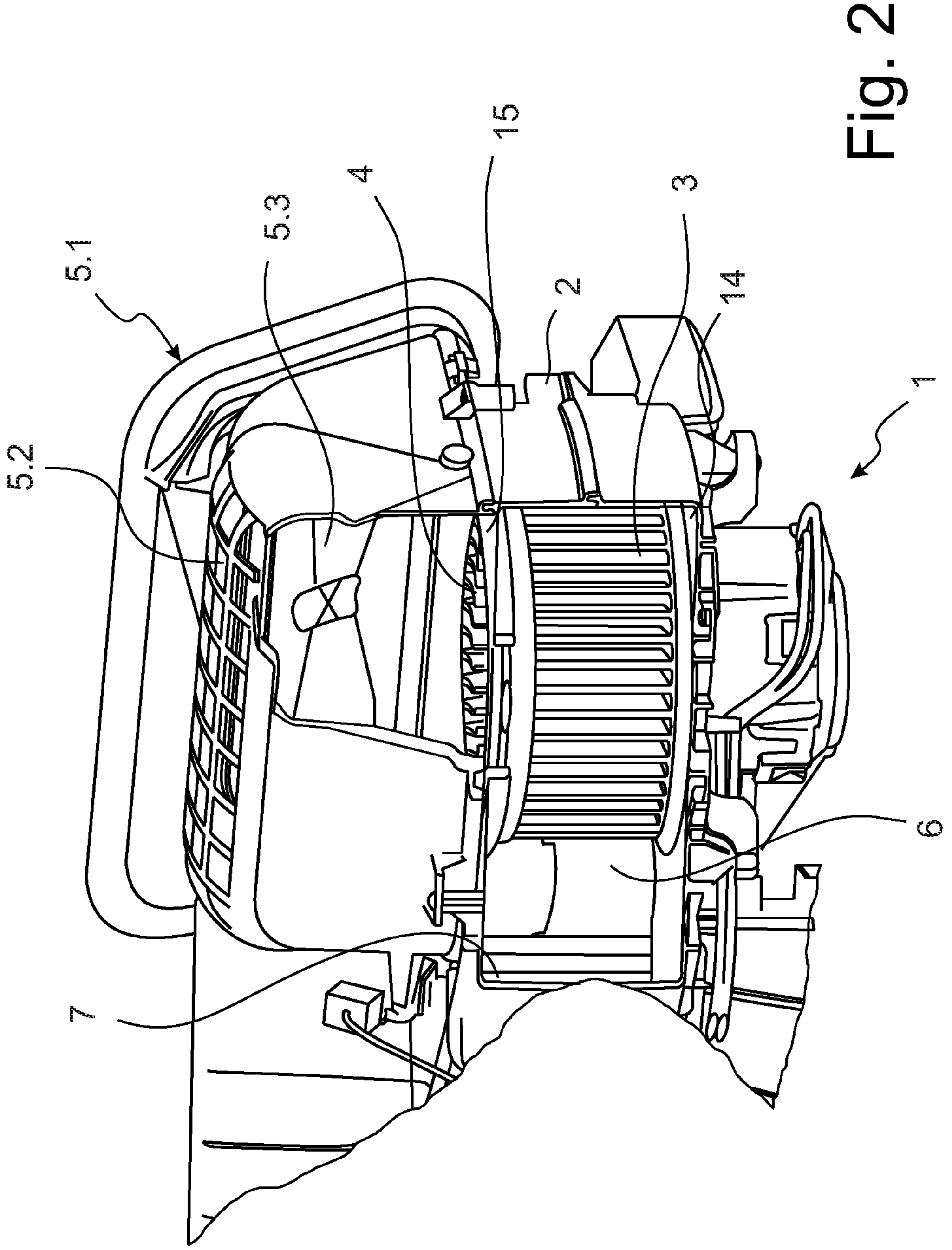
FIG. 2: shows a schematic sectional diagram of the exemplary embodiment of a radial fan for a motor vehicle air conditioning unit shown in FIG. 1, FIG. 3: shows a schematic diagram of an exemplary embodiment of the device according to the invention.

FIG. 2 shows a schematic sectional diagram of the exemplary embodiment, shown in FIG. 1, of a radial fan 1 according to the prior art for a motor vehicle air conditioning unit. The section runs axially in relation to the rotational axis of the fan wheel 3 through the air inlet housing 5 and through the fan housing 2 to allow a view into a spiral flow channel 14, of the fan tongue 6 and of the fan wheel 3. The axial air inlet opening 4 is formed within an air inlet opening plane 15. Above the axial air inlet opening 4, the air inlet housing 5 is situated, in which a recirculation air flap 5.3 is arranged such that it can pivot over some regions of the axial inlet opening 4. The housing-side transition of the fan tongue 6 into the spiral flow channel 14 to the air outlet opening 7 has a radius.

Figure 3:
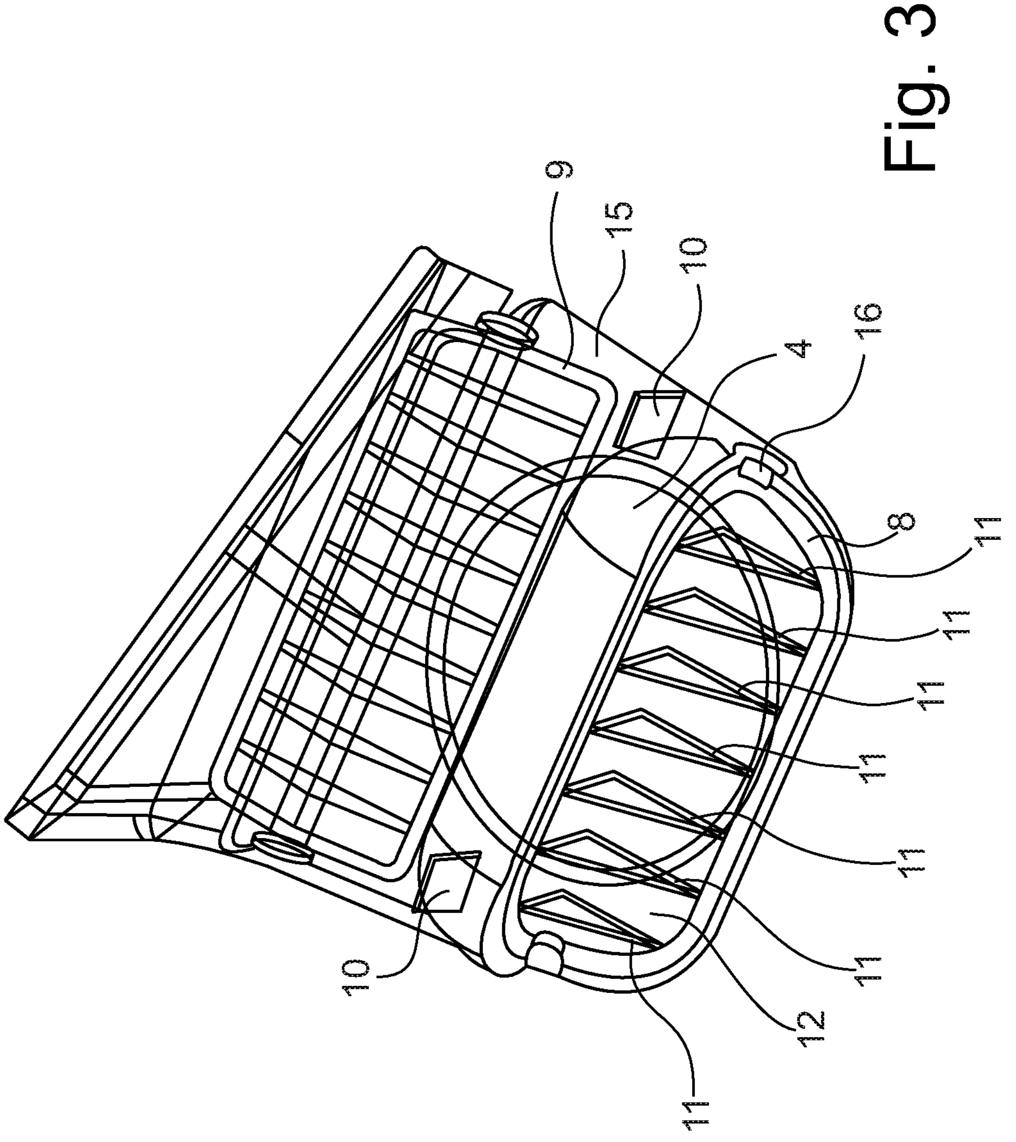
Figure 5:
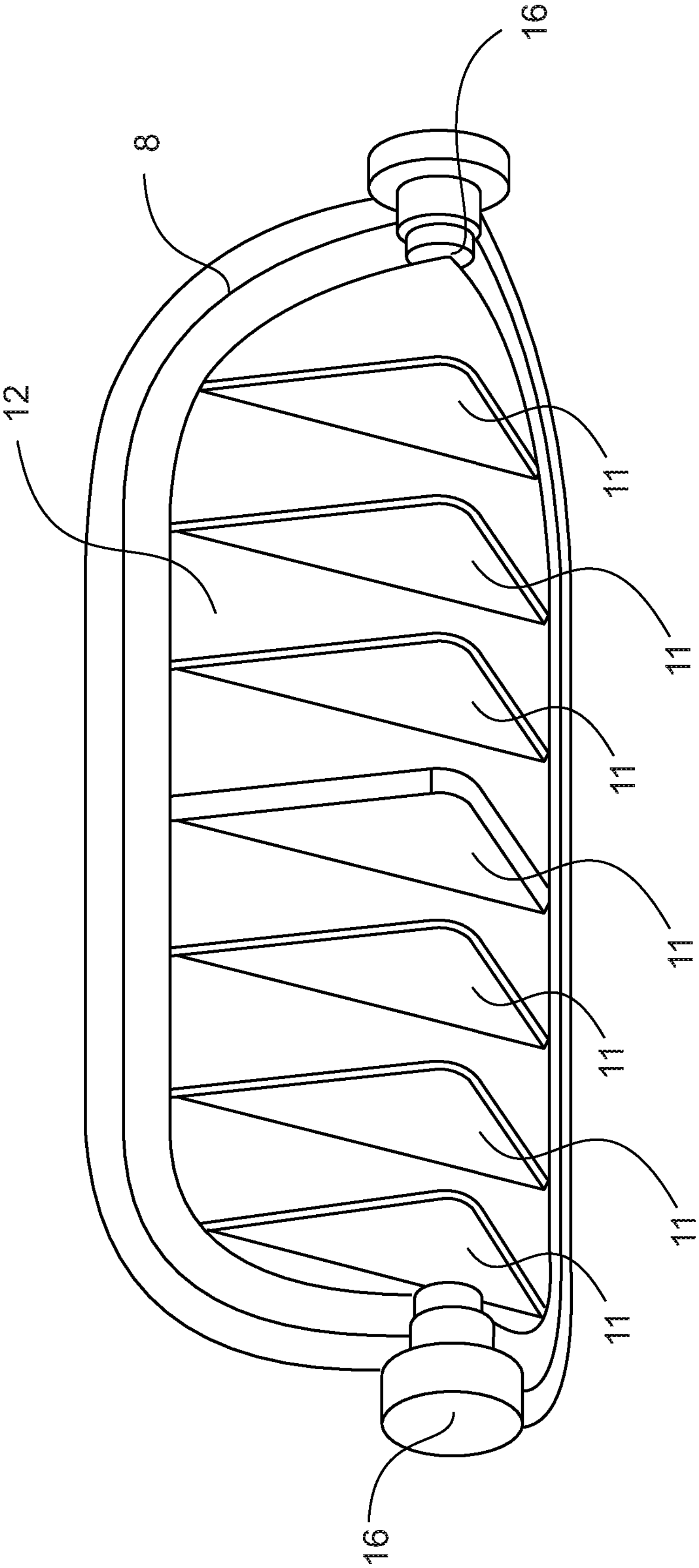

FIG. 3 shows a schematic diagram of an exemplary embodiment of the device according to the invention. This is a perspective and transparent view from above of the opening cross section of the axial air inlet opening 4 of the fan housing 2. FIG. 3 thus allows a view into the interior of an air inlet housing (not shown in detail), in which a recirculation air flap 8 and a further flap 9, which can also be referred to as a fresh air flap, are situated. The circular axial air inlet opening 4 is formed within the air inlet opening plane 15. The recirculation air flap 8, which is arranged pivotably on fastening elements 16 above the axial air inlet opening 4, is used to change air flow paths generated by the fan wheel 3 (not shown). The fastening elements 16 are used as flap bearings for the recirculation air flap 8. The pivot region of the recirculation air flap 8 extends over some regions of the opening cross section of the axial air inlet opening 4. The fastening elements 16 can be formed on the air inlet housing or on the air inlet opening plane 15 of the fan housing 2. An inside 12 of the recirculation air flap 8 is designed to deflect an air flow in the direction of the axial air inlet opening 4. According to the design of the recirculation air flap 8, the inside 12 of the recirculation air flap 8 is situated at a distance from the pivot axis of the recirculation air flap 8. The pivot region permits pivoting between at least two positions. In a first position of the recirculation air flap 8, fresh air operation is made possible, wherein air is deflected from a fresh air opening in the direction of the axial air inlet opening 4. In a second position of the recirculation air flap 8, recirculation air operation can be realised, wherein air is drawn in from a flow path for recirculation air and deflected in the direction of the axial air inlet opening 4. The recirculation air flap 8 is pivotable in the pivot region between the first and second positions, wherein the inside 12 of the recirculation air flap 8 in the first and in the second position is positioned for example at an angle of 45° in relation to the air inlet opening plane 15. On the inside, seven plate-shaped air guiding elements 11 are arranged in mutually spaced parallel planes oriented at right angles to the recirculation air pivot axis. A detail diagram of the recirculation air flap 8 is shown in FIG. 5. The further flap 9 is arranged opposite the recirculation air flap 8 inside a flow channel for fresh air. Two air flow limiting elements 10 extend vertically out of the air inlet opening plane 15 next to the axial air inlet opening 4. The air flow limiting elements 10 are arranged next to the opening cross section of the axial air inlet opening 4 such that they are situated between the recirculation air flap 8 and the further flap 9. The surfaces of the plate-shaped air flow limiting elements 10 each limit air flows along the air inlet opening plane 15 next to the axial air inlet opening 4. The flow paths next to the opening cross section of the axial air inlet opening 4 are thus blocked along the air inlet opening plane 15. The height of the plate-shaped air flow limiting elements 10 extends at least over the height of the fastening elements 16, which are provided to hold the recirculation air flap 8 over the air inlet opening plane 15. A fastening of the plate-shaped air flow limiting elements 10 can be provided on the inlet opening plane 15 and/or on the inner walls of the air inlet housing (not shown in detail here). It can also be provided for the plate-shaped air flow limiting elements 10 to be designed as integral components of the air inlet housing, so that it is possible to retrofit existing systems by exchanging an air inlet housing having the plate-shaped air flow limiting elements 10.

Figure 4A:
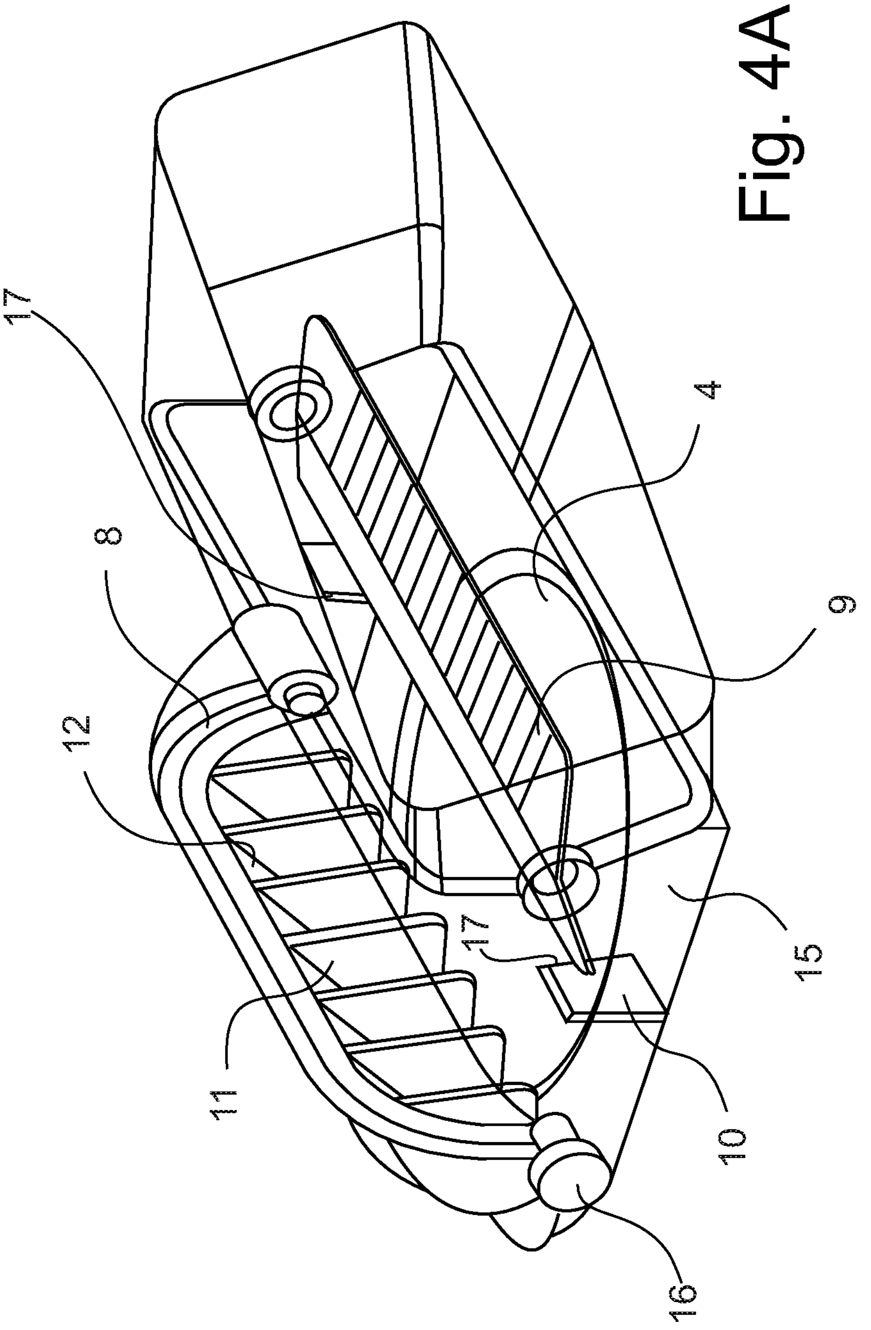
FIG. 4A: shows a schematic perspective diagram of an exemplary embodiment of the device according to the invention.

FIG. 4A shows a schematic perspective diagram of an exemplary embodiment of the device according to the invention. The perspective diagram of the exemplary embodiment of the device according to the invention shows the recirculation air flap 8 above the opening cross section of the axial air inlet opening 4. The pivot region of the recirculation air flap 8 extends over some regions of the opening cross section of the axial inlet opening 4, wherein the fastening elements 16 for attaching the recirculation air flap 8 are arranged outside the edge region of the axial air inlet opening 4. The fastening elements 16 which are provided for holding the recirculation air flap 8 and for realising the pivoting function of the recirculation air flap 8 are situated on the air inlet opening plane 15 of the axial air inlet opening 4. Next to the opening cross section of the axial air inlet opening 4, two opposing air flow limiting elements 10 extend vertically out of the air inlet opening plane 15 outside the pivot region of the recirculation air flap 8. The plate-shaped air flow limiting elements 10 are arranged with their narrow sides opposite one another so that the surfaces of the long sides of the air flow limiting elements 10 extend from the edge of the axial air inlet opening 4 to the edge of the air inlet opening plane 15. This arrangement limits or blocks flows which would flow past along the axial air inlet opening 4 without the arrangement of the air flow limiting elements 10 next to the opening cross section. The air flow limiting elements 10 can thus be understood as shutters which limit the flow cross section via the opening cross section of the axial air inlet opening 4 in some regions. The air flow limiting elements 10 are dimensioned such that they protrude beyond the fastening elements 16 in their orientation at right angles to the air inlet opening plane 15. The facing narrow sides of the opposing air flow limiting elements 10 are designed as sloping sides 17.

The further flap 9 is arranged pivotably inside the flow channel for fresh air.

Figure 4B:
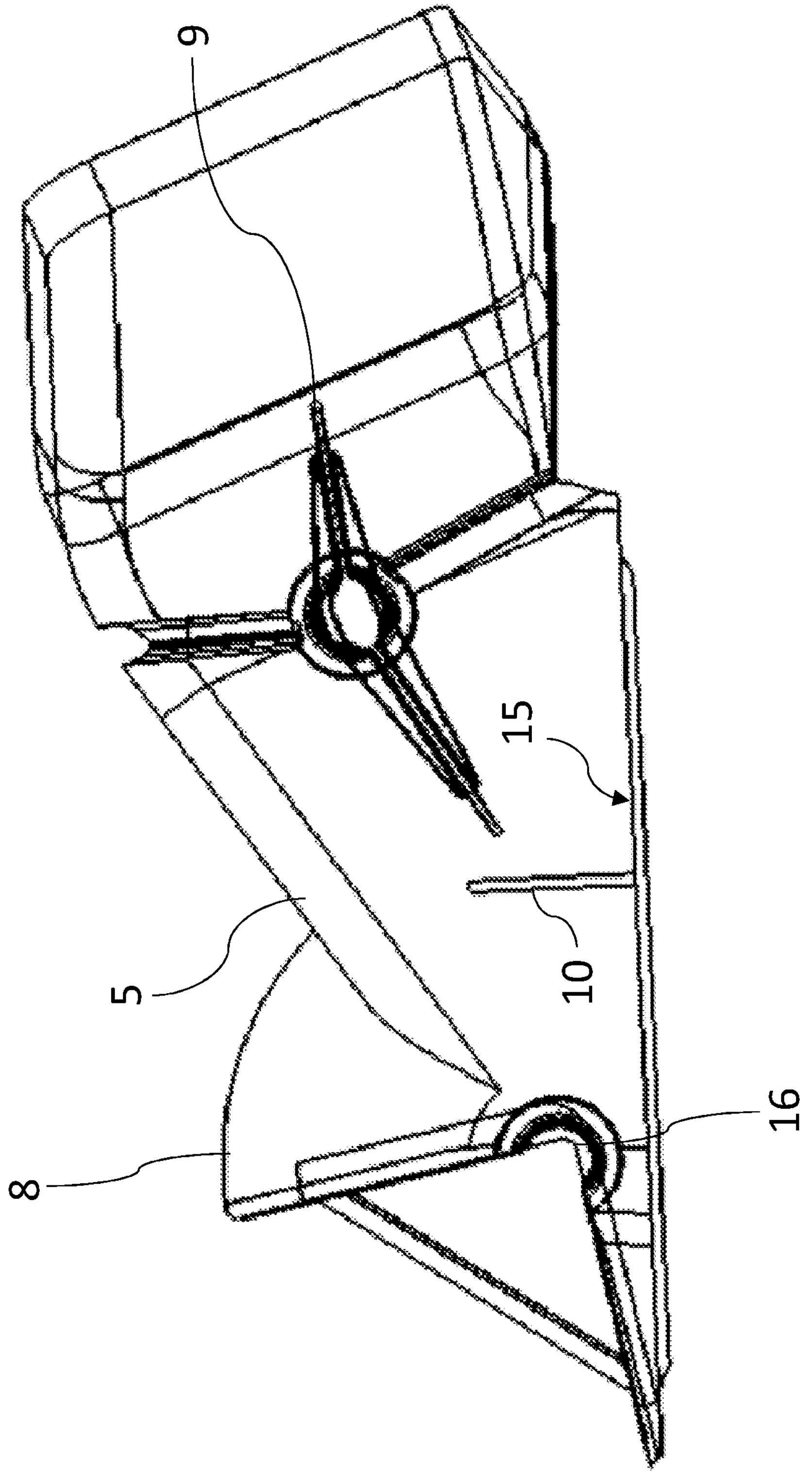
FIG. 4B: shows a further view of the exemplary embodiment of the device according to the invention shown in FIG. 4A, FIG. 5: shows a detail diagram of a recirculation air flap.

FIG. 4B shows a further view of the exemplary embodiment of the device according to the invention shown in FIG. 4A. In this FIG. 4B, the device according to the invention is shown in a side view in section through the air inlet housing 5, wherein one of two air flow limiting elements 10 can be seen. The air flow limiting element 10 extends vertically out of the air inlet opening plane 15. The height of the air flow limiting element 10 is dimensioned such that it protrudes beyond the fastening element 16 of the recirculation air flap 8.

FIG. 5 shows a detail diagram of an exemplary embodiment of the recirculation air flap 8. The detail diagram of the recirculation air flap 8 shows seven plate-shaped air guiding elements 11, which are arranged on the inside 12 of the recirculation air flap 8 in mutually spaced parallel planes at right angles to the recirculation air pivot axis. The parallel, spaced-apart plate-shaped air guiding elements 11 help to reduce circulation of the air flowing in an upper part of the axial air inlet opening 4 in front of the recirculation air flap 8 above the fan wheel 3. The plate-shaped air guiding elements 11 have a right-angled triangle shape.

Figure 6:
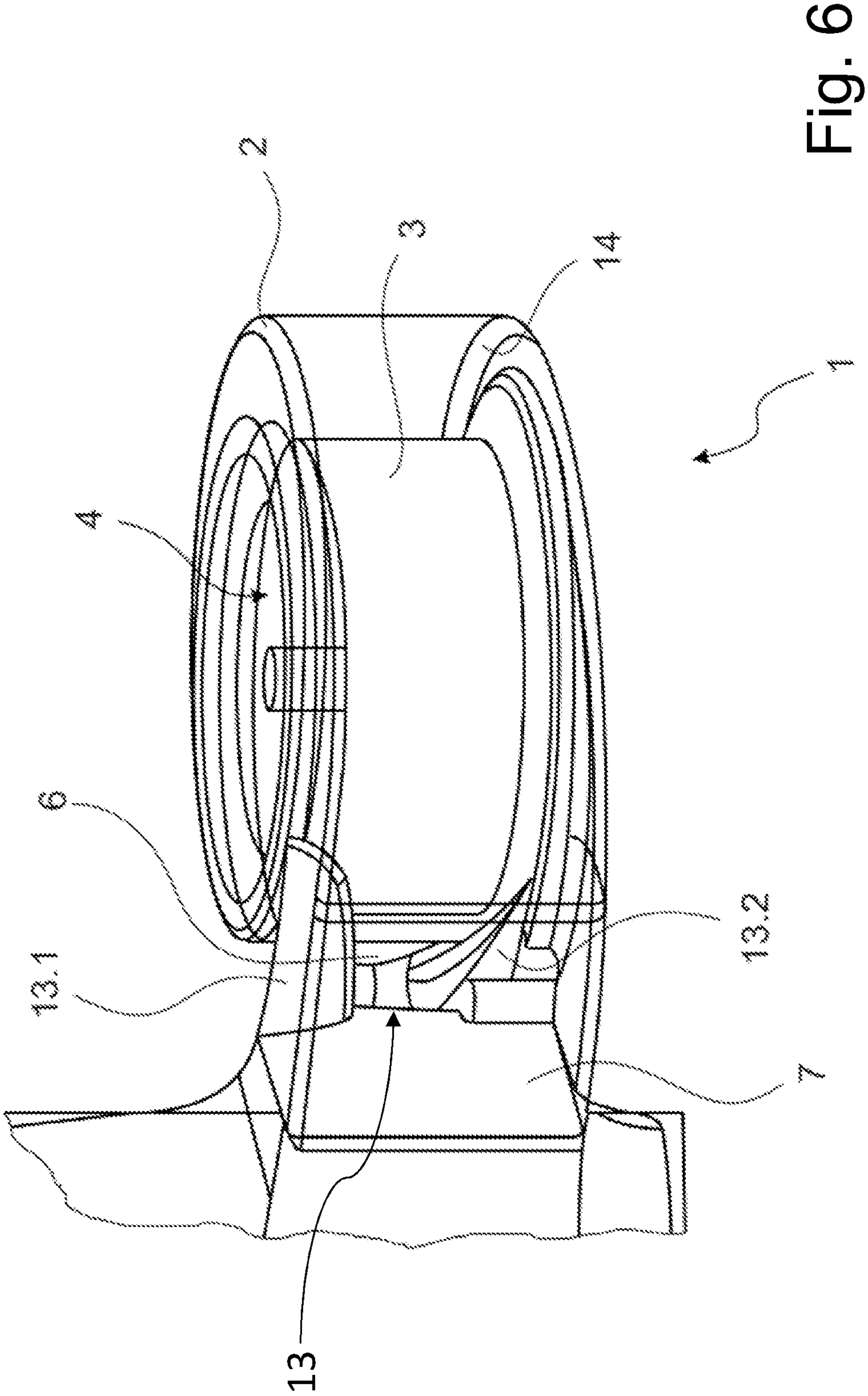
FIG. 6: shows a schematic diagram of an exemplary embodiment of the device according to the invention inside a radial fan.

FIG. 6 shows a schematic diagram of the device according to the invention inside a radial fan 1. The transparent diagram allows a view into the interior of the fan housing 2, of the fan wheel 3, the region of the fan tongue 6 and into a portion of the spiral flow channel 14. Reference sign 13 denotes an air flow guiding element, which is formed in two parts from an upper air flow guiding element 13.1 and a lower air flow guiding element 13.2. In the region of the fan tongue 6, the upper air flow guiding element 13.1 and the lower air flow guiding element 13.2 in the form of moulded parts, which can also be referred to as noses, are arranged on the fan tongue 6 opposing one another in the spiral flow channel 14. The air flow guiding elements 13.1 and 13.2 have different geometries and extend radially from the fan tongue 6 at a distance from the fan wheel 3 into the spiral flow channel 14. At comparatively high counterpressures, this design of the fan tongue 6 with the air flow guiding elements 13.1 and 13.2 arranged thereon results in the advantageous effect that only a small amount of air passes out of the spiral flow channel 14 through the blades of the fan wheel 3 back into the axial air inlet opening 4. Advantageously, the conveyed air thus passes with a lower resistance into a diffuser adjoining the fan housing 2.

Figure 7:
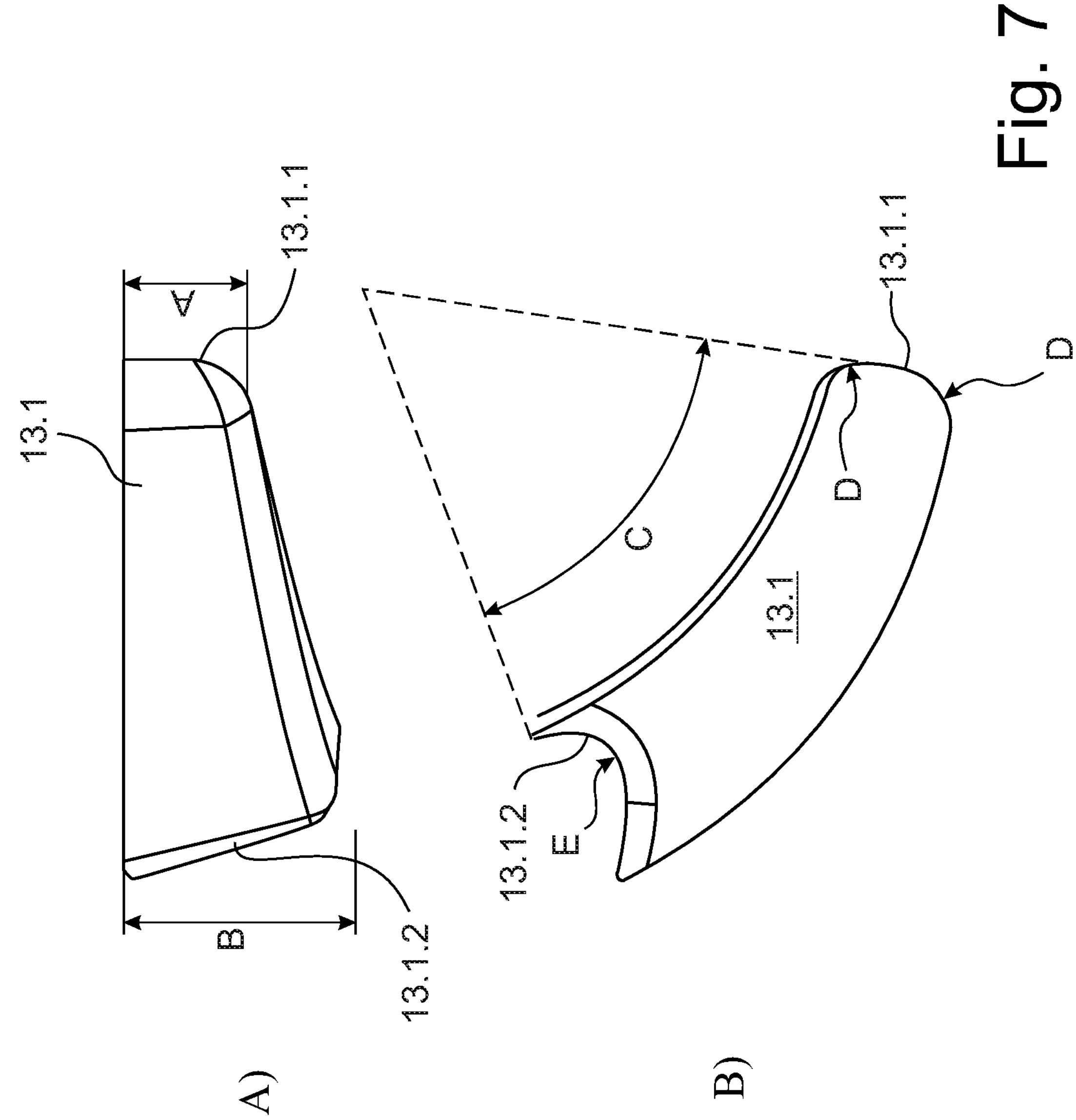
FIG. 7: shows a detail diagram of an exemplary embodiment of the upper air flow guiding element.

FIG. 7 shows a detail diagram of an exemplary embodiment of the upper air flow guiding element 13.1 in a first view A), which is a radial view from above, and in a second view B), which is an axial view from above. View A) shows the axial height of the upper air flow guiding element 13.1, which increases in the direction of flow from a tip 13.1.1. On a side 13.1.2 facing the fan tongue 6, the upper air flow guiding element 13.1 has an axial height B which corresponds to 0.35 times to 0.75 times the axial height of the fan wheel 3. The axial height A of the tip 13.1.1 of the upper air flow guiding element 13.1 pointing into the spiral flow channel 14 corresponds to a maximum of 0.7 times the axial height B of the upper air flow guiding element 13.1. The axial height thus increases from the tip 13.1.1 to the side 13.1.2.

At the tip 13.1.1, the upper air flow guiding element 13.1 has a radius D which corresponds to 0.25 times to 0.75 times the radius formed on the side 13.1.2 facing the fan tongue 6. The radius E corresponds to the radius at the fan tongue 6. The radius D at the tip 13.1.1 is thus smaller than the radius of the fan tongue 6.

The upper air flow guiding element 13.1 has a wrap angle C related to the fan wheel 3 in the range of 47° and 67°.

The radial width of the upper air flow guiding element 13.1 increases in the direction of flow, i.e., from the tip 13.1.1 in the direction of the side 13.1.2 facing the fan tongue 6.

LIST OF REFERENCE NUMERALS

1 Radial fan
2 Fan housing
3 Fan wheel
4 Axial air inlet opening
5 Air inlet housing
5.1 Fresh air inlet
5.2 Recirculation air inlet
5.3 Recirculation air flap
6 Fan tongue
7 Air outlet opening
8 Recirculation air flap
9 Flap/fresh air flap
10 Air flow limiting element
11 Plate-shaped air guiding elements
12 Inside
13 Air flow guiding element
13.1 Upper air flow guiding element
13.1.1 Tip
13.1.2 Side facing fan tongue 6
13.2 Lower air flow guiding element
14 Spiral flow channel
15 Air inlet opening plane
16 Fastening elements
17 Sloping sides
A Axial height
B Axial height
C Wrap angle
D Radius
E Radius

What is claimed is:

1. A device for reducing noise of motor vehicle air conditioning units, the device comprising:

a radial fan, in which a driven fan wheel draws in air via an axial air inlet opening and the air drawn in is conveyed from an interior of the fan via a fan tongue to an air outlet opening, wherein a recirculation air flap is arranged pivotably at least in some areas over the axial air inlet opening in such a way that an air flow on an inside of the recirculation air flap can be deflected in a direction of the axial air inlet opening, the device further comprising:

at least one air flow limiting element which projects laterally on an outer circumference of the axial air inlet opening vertically out of an air inlet opening plane and thereby has a surface which limits or blocks a flow path next to the axial air inlet opening;

at least two plate-shaped air guiding elements, which are arranged on the inside of the recirculation air flap in parallel planes at right angles to an axis of rotation of the recirculation air flap; and an air flow guiding element arranged on the fan tongue, which extends radially from the fan tongue at a distance from the fan wheel into a spiral flow channel.

2. The device according to claim 1, wherein the at least one air flow limiting element is arranged in front of the recirculation air flap in a direction of flow of the air drawn in.

3. The device according to claim 1, wherein the at least one air flow limiting element is an integral component of the fan housing or of an air inlet housing.

4. The device according to claim 1, wherein a height of the at least one air flow limiting element projecting vertically out of the air inlet opening plane is less than a highest position of the recirculation air flap above the air inlet opening plane.

5. The device according to claim 1, wherein there are two air flow limiting elements arranged laterally opposite one another on the outer circumference of the axial air inlet opening, the air flow limiting elements arranged opposite one another having sloping sides leading away from one another on their facing narrow sides.

6. The device according to claim 1, wherein a plurality of the plate-shaped air guide elements are arranged on the inside of the recirculation air flap, the plurality of the plate-shaped air guide elements being evenly spaced apart.

7. The device according to claim 1, wherein the plate-shaped air guide elements are integral components of the recirculation air flap.

8. The device according to claim 1, wherein the air flow guiding element has a recess tapering in a direction of the air outlet opening.

9. The device according to claim 1, wherein the air flow guiding element is an integral component of the fan housing in a form of an extension of the fan tongue.

10. The device according to claim 1, wherein the air flow guiding element has a wrap angle related to the fan wheel in a range of 47° and 67°.

11. The device according to claim 1, wherein the air flow guiding element is formed in two parts from an upper air flow guiding element and a lower air flow guiding element, the upper air flow guiding element and the lower air flow guiding element being arranged axially opposite one another.

12. The device according to claim 11, wherein the upper air flow guiding element and/or the lower air flow guiding element has/have a tip pointing into the spiral flow channel with a radius which corresponds to 0.25 times to 0.75 times a radius of the fan tongue.

13. The device according to claim 12, wherein the upper air flow guiding element and/or the lower air flow guiding element on the fan tongue has/have an axial height which corresponds to 0.35 times to 0.75 times an axial height of the fan wheel, an axial height of the tip of the upper air flow guiding element and/or of the lower air flow guiding element corresponds to a maximum of 0.7 times the axial height at the fan tongue.

14. The device according to claim 13, wherein the axial height of the upper air flow guiding element and/or the lower air flow guiding element increases from the tip in a direction of flow.

15. The device according to claim 14, wherein a radial width of the upper air flow guiding element and/or the lower air flow guiding element increases in the direction of flow.

* * * * *